United States Patent
Tanaka

(10) Patent No.: US 6,417,913 B2
(45) Date of Patent: Jul. 9, 2002

(54) METHOD AND APPARATUS FOR ORDERING PHOTOGRAPHIC PRINTS AND PRINTING APPARATUS FOR PRODUCING THE SAME

(75) Inventor: Hiroshi Tanaka, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/741,003

(22) Filed: Dec. 21, 2000

(30) Foreign Application Priority Data

Jan. 14, 2000 (JP) ........................................ 2000-010122

(51) Int. Cl.⁷ ........................ G03B 27/32; G03B 27/80; G03B 17/24; G03B 17/26; H04N 1/32
(52) U.S. Cl. ........................ 355/39; 355/38; 396/319; 396/511; 396/513; 396/679; 358/442; 358/448; 358/501; 358/530
(58) Field of Search ..................... 355/38, 39; 396/319, 396/511, 513, 639; 358/448, 442, 501, 530

(56) References Cited

U.S. PATENT DOCUMENTS

| | | | | |
|---|---|---|---|---|
| 4,920,376 A | * | 4/1990 | Yamamoto | ................... 355/38 |
| 5,168,444 A | * | 12/1992 | Cukor et al. | ................. 364/401 |
| 5,258,859 A | * | 11/1993 | Wada et al. | ................. 358/487 |
| 5,420,699 A | * | 5/1995 | Yamanouchi et al. | ....... 358/487 |
| 5,608,542 A | * | 3/1997 | Krahe et al. | ................. 358/449 |
| 5,647,552 A | * | 7/1997 | Takatori | ...................... 396/513 |
| 5,666,215 A | * | 9/1997 | Fredlund et al. | ............ 358/487 |
| 5,819,126 A | * | 10/1998 | Kitagawa et al. | ........... 396/319 |
| 6,017,157 A | * | 1/2000 | Garfinkle et al. | ........... 396/639 |

FOREIGN PATENT DOCUMENTS

| | | |
|---|---|---|
| JP | 11-150673 | 6/1999 |
| JP | 2000-118090 | 4/2000 |

* cited by examiner

Primary Examiner—Russell Adams
Assistant Examiner—Khaled Brown
(74) Attorney, Agent, or Firm—McGinn & Gibb, PLLC

(57) ABSTRACT

A digital camera loaded with a removable memory card storing image files and a print order file, in a wireless mode, sends the files to a computer via a handy phone set, and prepares a directory information file in which the files are virtually positioned in a preselected layer, so that the directory structure of the memory card can be reconstructed. The camera then accesses the handy phone set to send the files to the computer. The computer reconstructs the original directory structure and file names based on the directory information file and then prints out the image data of the image files in accordance with the print order file. The computer produces prints in the same manner as when directly reading the image data from the memory card.

22 Claims, 15 Drawing Sheets

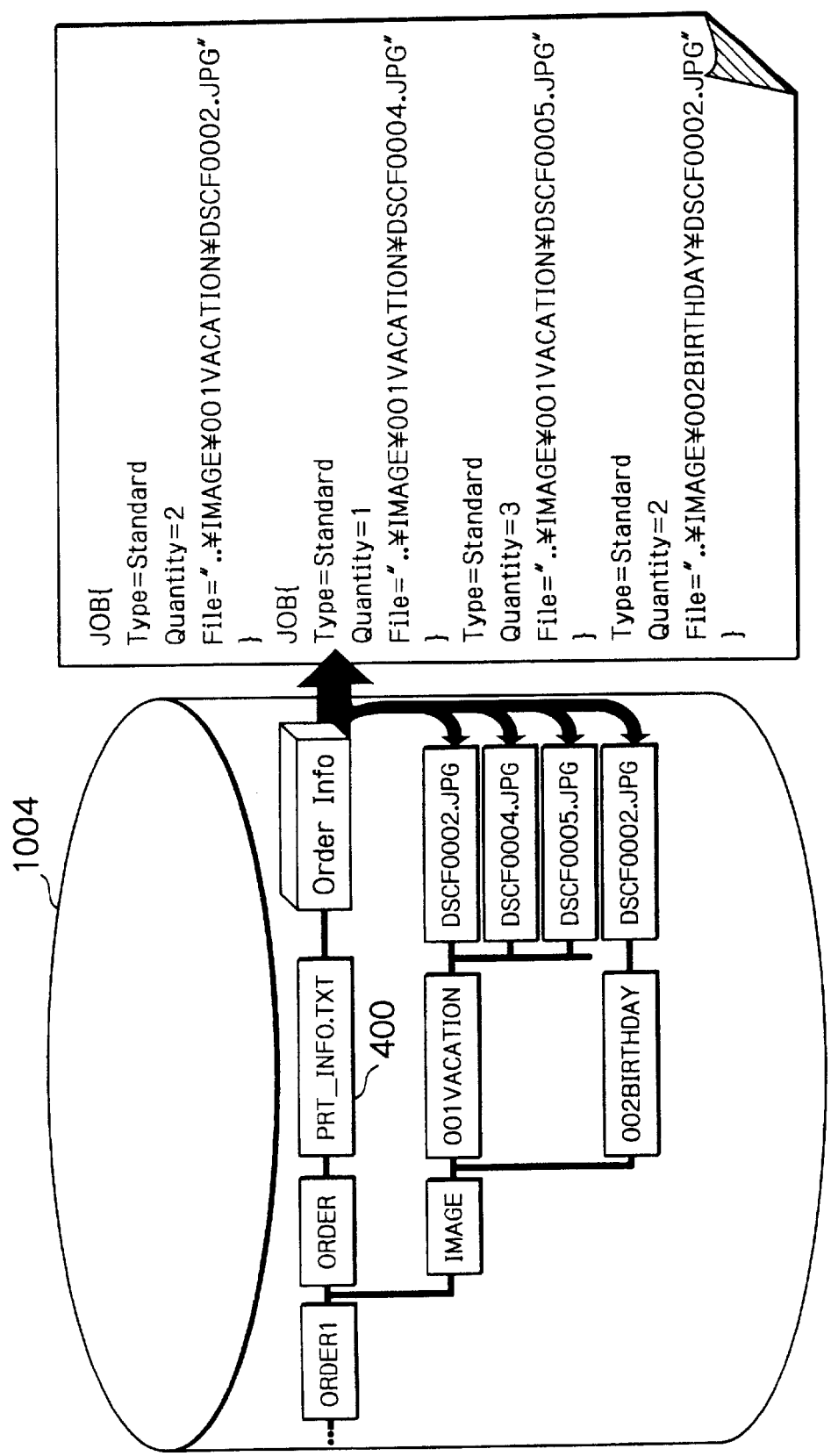

METHOD AND APPARATUS FOR ORDERING PHOTOGRAPHIC PRINTS AND PRINTING APPARATUS FOR PRODUCING THE SAME

BACKGROUND OF THE INVENTION

1. Field of the Invention

The present invention relates to a method and an apparatus for ordering photographic prints of image data stored in a data recording medium, and a printing apparatus for producing photographic prints in accordance with an order.

2. Description of the Background Art

Today, a digital still camera capable of shooting a desired scene and storing image data representative of the scene in a memory card, which is removably mounted thereto, is extensively used. The image data stored in the memory card may be processed by a computer or similar image processor and displayed thereon or may be input to a color printer to be printed out on recording sheets thereby, as desired. Modern printers, including ink jet printers, are capable of printing high-definition images. As for a system using silver halide photosensitive type of films, prints featuring not only high definition but also high preservability are achievable and usually produced at, e.g., camera service stations where high-quality print services are available. A digital still camera is constructed to record various information, including desired frames to print and the desired numbers of prints, in a recording medium together with image data. This allows the user of the camera to readily place an order with the above service station for prints.

Japanese Patent Laid-Open Publication No. 150673/1999, for example, discloses a digital camera that allows the user of the camera, intending to order the prints of digital image data, to set a desired number of prints in the camera. This digital camera also stores data relating to the desired number of prints together with the image data.

In any case, the user of the camera brings the recording media, which stores the image data and information relating thereto, to a service station where a print service is available. At the service station, a system implementing the print service reads the image data and information out of the recording medium and then prints out the image data on recording sheets. In this manner, an order for prints has customarily been given to a service station by the hand-over of a recording medium.

On the other hand, in parallel with the spread of cellular phones or similar mobile radio communication apparatuses, there has been contemplated to give an order for prints to a service station via such apparatuses. Arrangements for ordering prints are closely related to a digital camera in the system aspect. However, as far as a general-purpose phone system is concerned, the exclusive arrangements for ordering prints would be extraneous and redundant if built in a handy phone set in circumstances not needing an order for prints. Further, the handy phone set provided with this kind of function makes it practically impossible for the user to give an order if the service station to deal with the order lacks compatibility with a cellular phone system having the same function.

Moreover, a memory card or similar recording medium stores various kinds of files. Providing a handy phone set with functions of distinguishing and searching for such files would increase loads on the processing and operation of the handy phone set. Specifically, each camera may record image data in a particular format, e.g., in a particular directory or in a deep layer. Should a handy phone set be constructed to interpret the contents of order files recorded in such various formats, the construction and operation of the handy phone set would be sophisticated.

As stated above, a cellular phone or similar communication apparatus is extraneous to the order of prints customary with a digital camera. It follows that noticeably modifying the structure of a handy phone set in order to input an order of prints thereon is likely to aggravate the redundancy of a telephone system.

SUMMARY OF THE INVENTION

It is therefore an object of the present invention to provide a method and an apparatus capable of sending desired image files without requiring a handy phone set to interpret an order of prints or noticeably modifying the conventional ordering method or printing method, which is based on the hand-over of a recording medium, and a printing apparatus for producing prints.

In accordance with the present invention, a print ordering method causes, via a communicating apparatus, a printing apparatus to print images represented by image data stored in a data recording medium. The data recording medium stores the image data and order information for causing the printing apparatus to print desired image data. The print ordering method includes the steps of selecting image files designated by the order information, informing the communicating apparatus of a virtual directory structure consisting of the image files selected and order information, and sending structure information for allowing an original directory structure to be reconstructed from the virtual directory structure to the communicating apparatus together with the order information and image data selected.

Further, in accordance with the present invention, a print ordering apparatus causes, via a communicating apparatus, a printing apparatus to print images represented by image data stored in a data recording medium. The data recording medium stores the image data and order information for causing the printing apparatus to print desired image data. The print ordering apparatus includes a section for selecting image files designated by the order information, a section for informing the communicating apparatus of a virtual directory structure consisting of the image files selected and order information, and a section for sending structure information for allowing an original directory structure to be reconstructed from the virtual directory structure to said communicating apparatus together with the order information and image data selected.

Moreover, in accordance with the present invention, a print ordering system includes a print ordering apparatus for ordering prints of images represented by image data stored in a data storing medium. The data storing medium stores the image data in a plurality of directories and order information for causing desired image data to be printed. A printing apparatus produces prints of the desired image data in accordance with the order information received from the print ordering apparatus via a communicating apparatus. The print ordering apparatus includes a section for selecting image files designated by the order information, a section for informing the communicating apparatus of a virtual directory structure, which consists of the image files selected and order information, by converting a first file name of the image data to a second file name and positioning the image data designated by the second file name in a preselected layer in the virtual directory structure, and a section for sending to said communicating apparatus the order information, image data selected and structure information that describes the first and second file names in a pair for allowing the original directory structure to be reconstructed from the virtual directory structure. The printing apparatus includes a section for receiving the image data, order information and structure information sent from said communicating apparatus, a section for reconstructing the original directory structure existing in the recording medium on the basis of a description of the pair, and a section for producing prints of the image data designated by the order information.

Moreover, in accordance with the present invention, a printing apparatus for receiving images represented by image data stored in a data storing medium via a communicating apparatus and printing the images. The printing apparatus includes a section for receiving via the communicating apparatus the image data and order information, which causes desired image data to be printed, in a virtual directory structure virtually indicating a directory construction of the image data and the order information, a section for receiving structure information for reconstructing an original structure from the virtual directory structure, a section for reconstructing, based on the structure information, a directory structure of the image data and the structure information in the data storing medium, and a section for printing out the image data, which have the directory structure reconstructed, in accordance with the order information.

BRIEF DESCRIPTION OF THE DRAWINGS

The objects and features of the present invention will become more apparent from the consideration of the following detailed description taken in conjunction with the accompanying drawings in which:

FIG. 16 is a diagram showing the directory structure and print order file reconstructed by the procedures of FIG. 15.

DESCRIPTION OF THE PREFERRED EMBODIMENT

Figure 6:
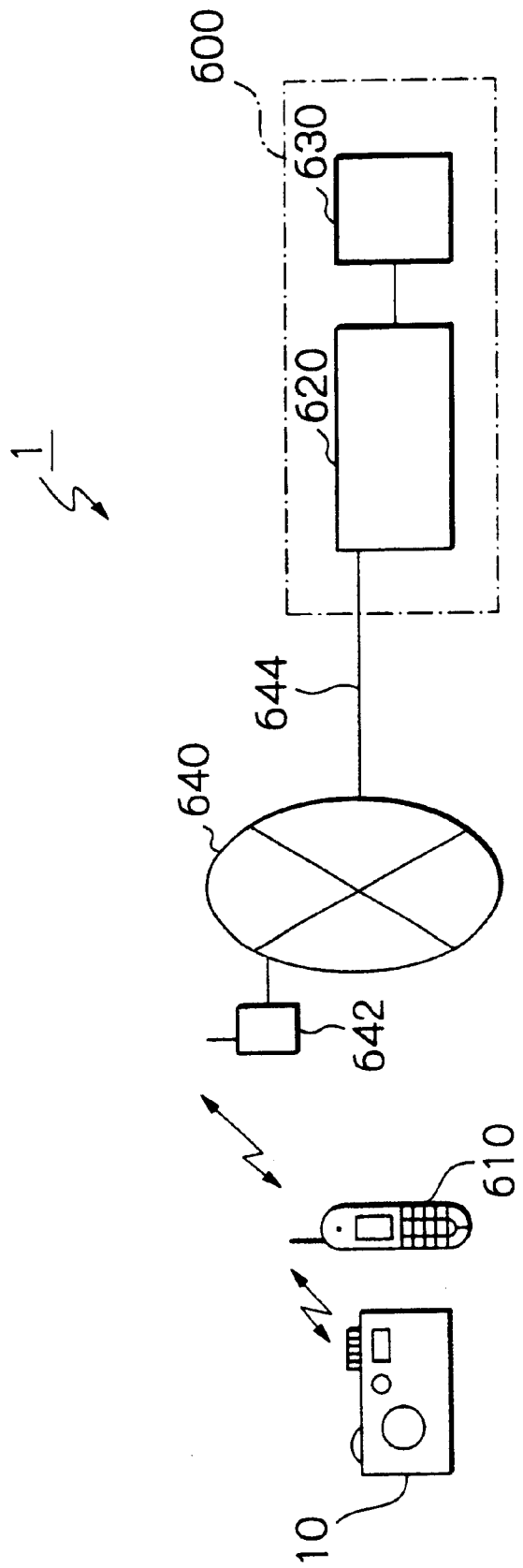
FIG. 6 is a view showing the general construction of a print ordering system to which the present invention is applied.

Referring to FIG. 6, a print ordering system embodying the present invention is shown and generally designated by the reference numeral 1. As shown, the print ordering system 1 is generally made up of a digital camera 10, a handy or cellular phone set or mobile station 610, a base station 642 connected to a communication network 640 such as a public switched telephone network (PSTN), and a computer system 600. The computer system 600 includes a computer 620 and a printer 630. The camera 10 sends image data stored therein to the computer system 600 via the handy phone set 610 together with order information for ordering the printing of the image data. The computer system 600 prints out the received image data in accordance with the order information. Also, when a memory card 16 (see FIGS. 1 and 2) storing such image data and order information is handed over to the computer system 600 and connected to the computer 620, the computer 620 directly reads the image data out of the memory card 16 and prints them out.

More specifically, the handy phone set 610 is connected to the computer 620 via the communication network 640. When the camera 10 sends information to the handy phone set 610, the handy phone set 610 transforms the information to a preselected communication format and then sends the information to the computer system 600. The base station 642 connected to the network 640 receives a radio wave from the handy phone set 610 and then sets up communication between the handy phone set 610 and the computer system 600. As a result, information begins to be transferred between the camera 10 and the computer 620. Part of the illustrative embodiment not directly relevant to the understanding of the present invention is not shown or described.

Figure 2:
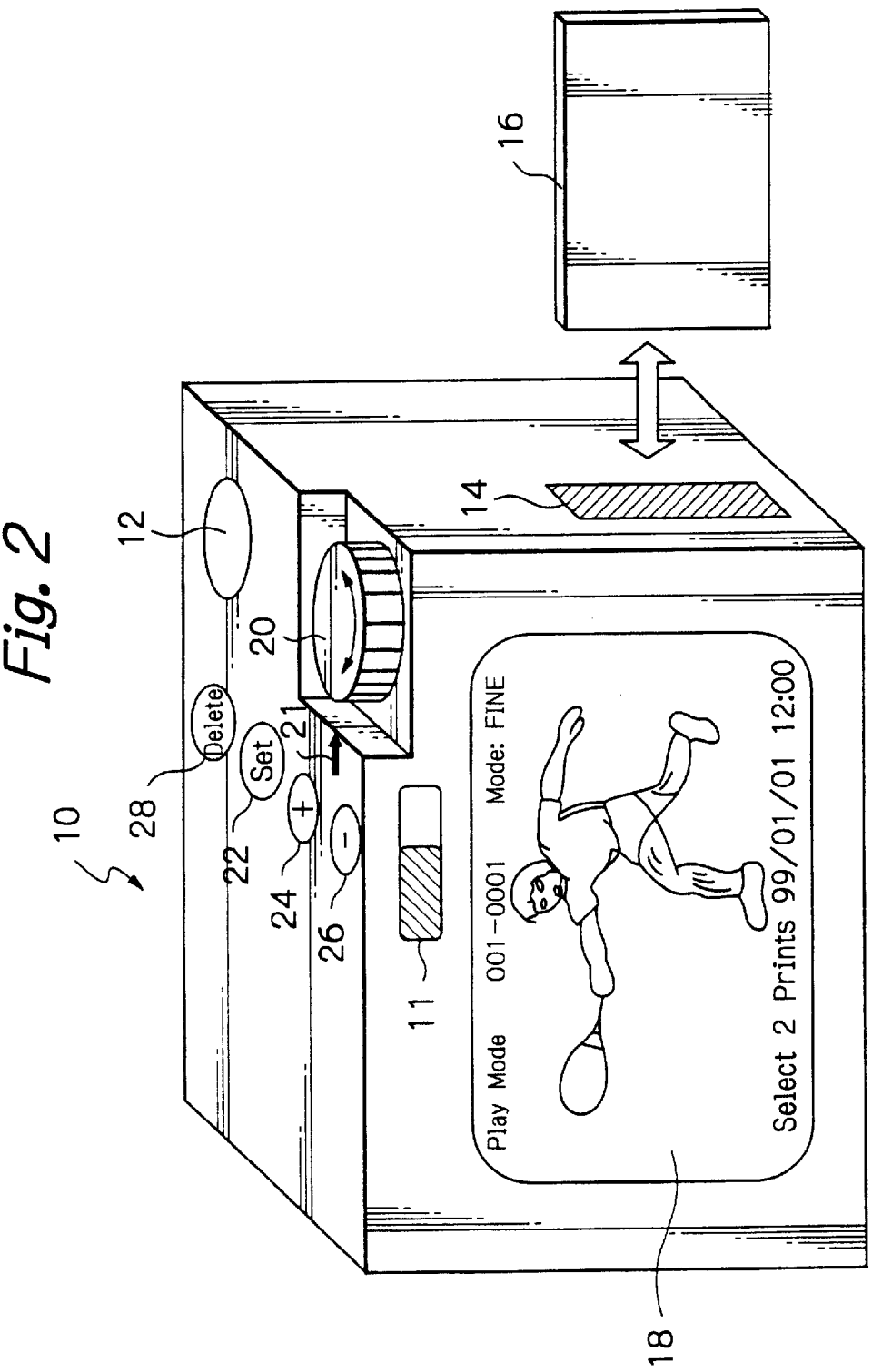
FIG. 2 is a perspective view showing specific external appearance of the digital camera shown in FIG. 1.

FIG. 2 shows a specific configuration of the camera 10. As shown, the camera 10 has a power switch 11 and a release button 12 arranged thereon. The memory card 16 mentioned earlier is removably inserted in a card slot 14 formed in the camera 10. A scene to be picked up is incident to an image sensor, not shown, built in the camera 10 via a lens not shown. When the operator of the camera 10 turns on the power switch 11, the camera 10 starts operating. Subsequently, when the operator pushes the release button 12 for shooting a desired scene, the image sensor transforms the image of the scene to an electric image signal. The image signal is subjected to image processing and then coded although not shown or described specifically. The resulting coded data are written to the memory card 16. The memory card 16 may be implemented by a flash ROM (Read Only Memory), EEPROM (Electrically Erasable and Programmable ROM) or similar nonvolatile semiconductor memory or a data storing medium loaded with an SRAM (Static Random Access Memory) backed up by a battery. The memory card 16 may alternatively be implemented by a floppy disk or similar magnetic data storing medium or an optical disk or similar optical data storing medium.

The image data stored in the memory card 16 may be read out, decoded and then reproduced in the form of a picture on a display panel 18 also mounted on the camera 10, as desired. Further, a signal representative of the reproduced image may be sent to the outside of the camera 10. In any case, various kinds of attribute information particular to such a reproduced picture appear on the display panel 18. In the illustrative embodiment, the display panel 18 is implemented by an LCD (Liquid Crystal Display).

Figure 3:
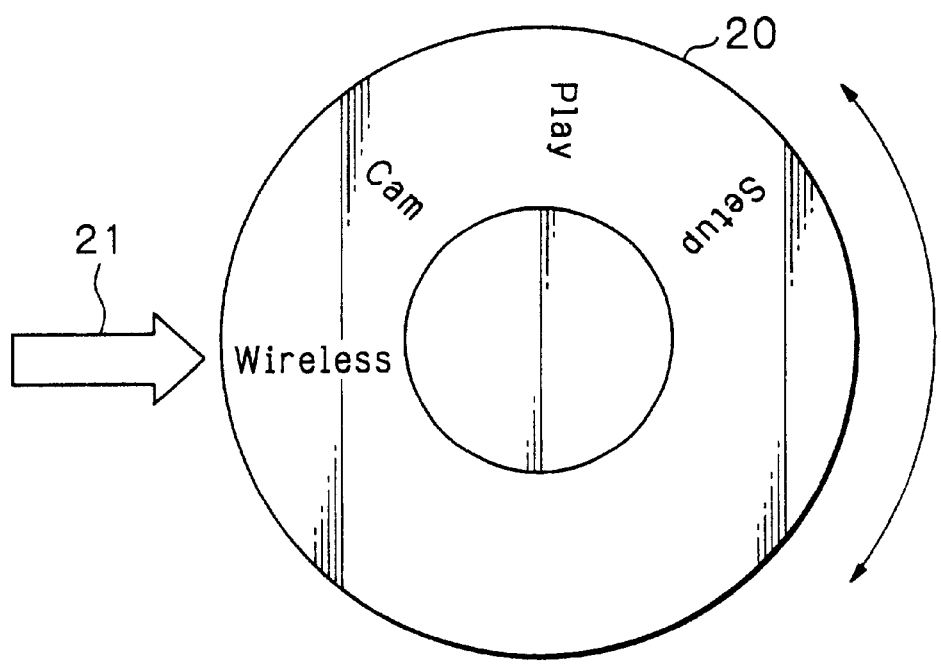
FIG. 3 is a plan view showing a specific configuration of a mode dial mounted on the digital camera.

In the illustrative embodiment, the camera 10 is operable in any one of four different modes, i.e., a camera or pickup mode, a play or reproduction mode, a setup or selection mode, and a wireless or communication mode. As shown in FIG. 2, a mode dial 20 is mounted on the camera 10 and accessible for selecting any one of the above four modes. Specifically, as shown in FIG. 3, four positions "Cam", "Play", "Setup" and "Wireless" are printed on the top of the mode dial 20 and representative of the camera mode, play mode, setup mode and wireless mode, respectively. The mode dial 20 can be turned clockwise or counterclockwise by finger, as indicated by a double-headed arrow in FIG. 3.

position "Cam" at a set mark 21, the camera 10 operates in the camera mode and picks up a scene while displaying the scene on the display panel 18, and records the scene in the memory card 16 when the release button 12 is pushed. When the position "Play" is located at the set mark 21, the camera 10 operates in the play mode and displays an image recorded in the memory card 16. Further, when the position "Setup" is brought to the set mark 21, the camera 10 operates in the setup mode and allows the operator to select desired operating conditions and functions. In addition, when the position "Wireless" is brought to the set mark 21, the camera 10 operates in the wireless mode for allowing information to be transferred between the camera 10 and the computer 620, FIG. 6.

As shown in FIG. 2, a set button 22, a forward (+) button 24, a reverse (−) button 26 and a delete button 28 are also arranged on the camera 10. In the play mode, the operator may select an image to print or delete an image by using the above buttons 22 through 28. Also, by operating the buttons 22 through 28, the operator may input print information that designates a picture appearing on the display panel 18 as a picture to print. The print information is also written to the memory card 16 as a print order file. The print information may be corrected or updated, as desired. The memory card 16 storing such information in a plurality of directories thereof is handed over to the computer system 600 capable of printing images in accordance with the print order file. Specifically, when the memory card 16 is connected to the computer 620 of the computer system 600, the computer 620 reads image files out of the memory card 16 and causes the printer 630 to print them in a designated format.

Further, in the wireless mode, the camera 10 transforms the print order file and image files recorded in a plurality of directories to data listed in a single virtual order directory and sends the virtual order directory to the computer 620. The computer 620 analyzes the information listed in the virtual order directory so as to reconstruct the original directory structure dealt with by the camera 10. Subsequently, the computer 620 causes the printer 630 to print images in accordance with the print order file.

Figure 1:
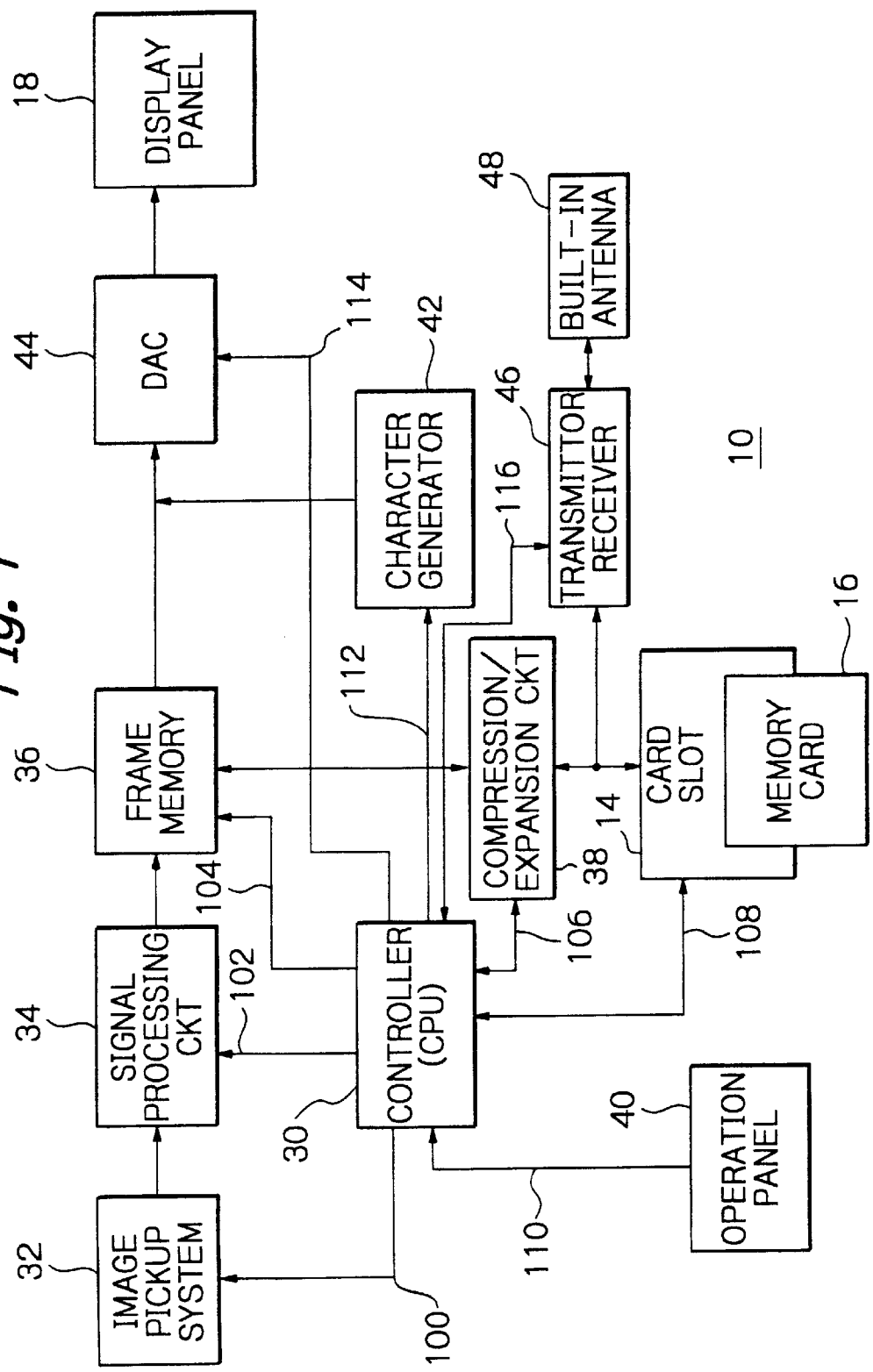
FIG. 1 is a block diagram schematically showing a digital camera to which the present invention is applied.

Reference will be made to FIG. 1 for describing a specific construction of the camera 10. As shown, the camera 10 includes a controller 30 implemented by a CPU (Central Processing Unit). An image pickup system 32, a signal processing circuit 34, a frame memory 36, a compression/expansion circuit 38, the card slot 14 and an operation panel 40 are connected to the controller 30 by connection lines 100 through 110, respectively. The controller 30 controls these blocks 32 through 40 and controls image pickup, recording and reproduction in accordance with information output therefrom. A character generator 42 and a digital-to-analog conversion (DAC) 44 are also connected to the CPU 30 by connection lines 112 and 114. The controller 30 controls the character generator 42 and DAC 44 in order to display an image picked up or reproduced together with information implemented by characters or icons. Further, a transmitter/receiver 46 is connected the controller 30 by a connection line 116 and capable of directly communicating with the handy phone set 610, FIG. 6, by radio.

In the wireless mode, the image data and print order file, which designates pictures represented by the image data, are read out of the memory card 16 and sent to the computer system 600. At this instant, the controller 30 produces the previously mentioned virtual order directory for ordering prints. Specifically, the controller 30 selects designated image files and virtually arranges it in a virtual order directory together with the print order file and a directory file representative of directory information within the camera 10. In the virtual order directory, the image files, print order file and directory file exist in the same layer as each other. The controller 30 shows the handy phone set 610 the virtual order directory and causes it to send the above information to the computer system 600.

Referring again to FIG. 2, the controller 30 causes the display panel 18 to display various information including a current mode, a frame number assigned to an image file being displayed, and an image quality mode or image compression ratio. The current mode, frame number and image quality mode appear in the upper portion of the display panel 18 and are shown as being "Play Mode", "001-0001" and "Mode: Fine", respectively, by way of example. Also, the controller 30 causes the display panel 18 to display, in its lower portion, print information representative of the conditions of order relating to the picture being displayed. The print information includes an icon and a desired number of prints, which are shown as being "Select" and "2 Prints", respectively, by way of example. Such modes also appear when the operator desires, in the play mode, to change the desired number of prints or to cancel the print specification by way of example, allowing the operator to perform an intended operation while watching the display panel 18. In the camera mode, the display panel 18 displays "Camera Mode" as the current mode and the current operating conditions of the camera 10. The various kinds of information may not be shown on the display panel 18 individually, if desired.

Further, the display panel 18 displays, under the control of the controller 30, the date of pickup and current date in its bottom right portion in accordance with the mode selected. The date of pickup is derived from attribute information associated with the image file, which is written to the memory card 16. The current date is based on a timepiece function available with a calendar timepiece included in the controller 30.

Figure 4:
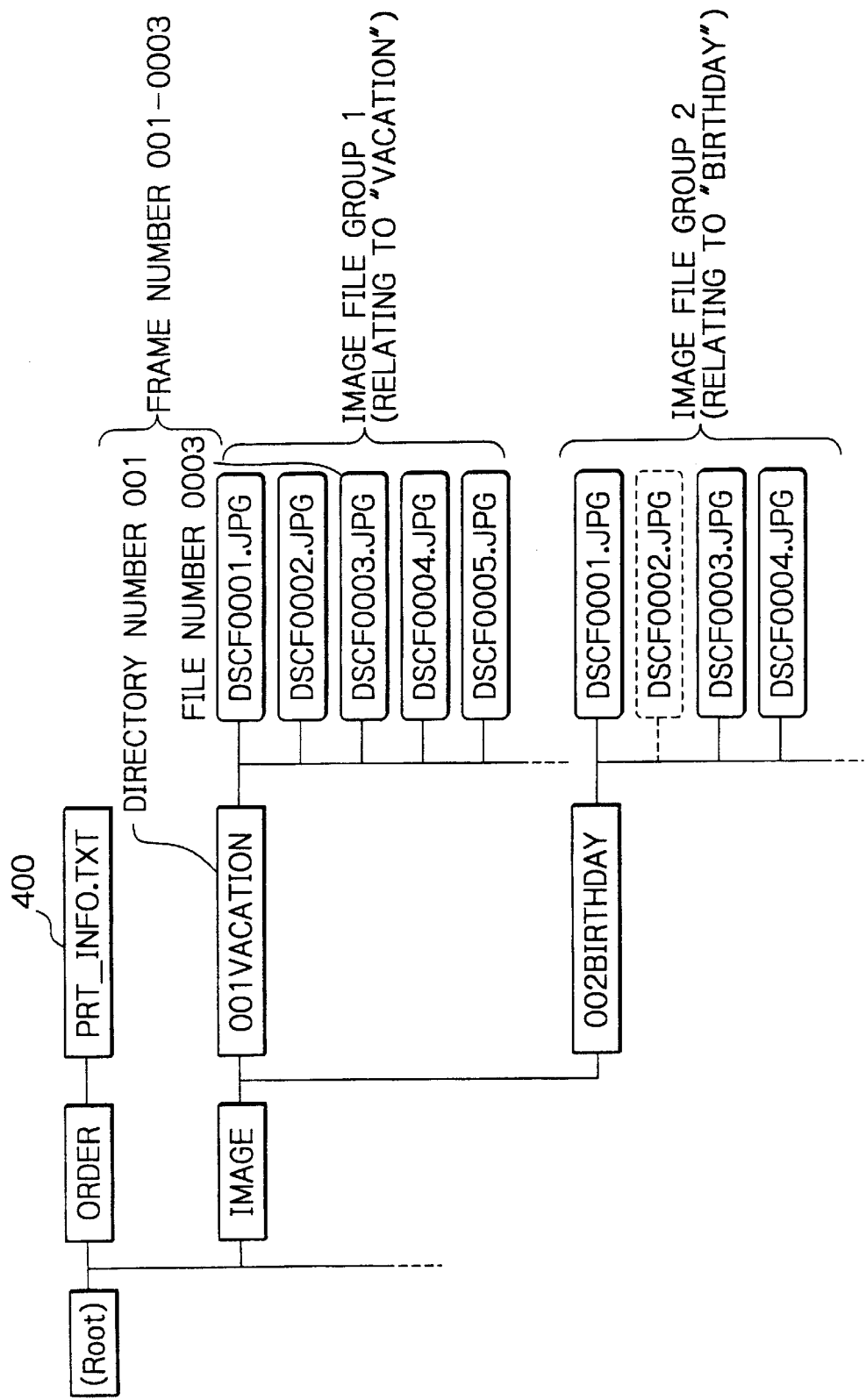
FIG. 4 is a diagram showing a directory structure formed in a memory card removably mounted to the digital camera.

FIG. 4 shows specific directories implemented as layers and dividing the image storage area of the memory card 16, which stores the image data and attribute information particular to the individual image data. As shown, a root directory "Root" branches off into a plurality of directories including "ORDER" and "IMAGE". The directory "IMAGE" branches off into a plurality of event directories, i.e., directories "001VACATION" and "002BIRTHDAY" in FIG. 4. The directories "001VACATION" and "002BIRTHDAY" each accommodate a group of image files. In this manner, the illustrative embodiment classifies directories by event. Alternatively, directories may be classified by the date of shot, scene or the characteristic of a subject in the image aspect. The directories so dividing the image storage area of the memory card 16 allow the image data to be classified or searched for later.

The directory "ORDER" subordinate to the root directory "Root" stores a print specification file "PRT_INFO.TXT"

400 including order information. In the illustrative embodiment, the image data stored in the directory "IMAGE" are provided with file names having a particular format "DSCFnnnn.JPG". In this format, "nnnn" is representative of an integral numerical value. The numerical values "nnnn" are serially assigned to each group of image files belonging to a particular directory, constituting image file numbers. The serial image file may include a missing number, e.g., the image file "DSCF0002.JPG" of the directory "¥IMAGE¥002BIRTHDAY", as shown in FIG. 4 specifically. "JPG" shows that the image data are coded by a JPEG (Joint Photographic Expert Group) system. In the illustrative embodiment, the directory "IMAGE" is divided by a directory number "mmm" (integral numerical value) such that directory numbers "001" and "002" are assigned to the directories "001VACATION" and "002BIRTHDAY", respectively. Each directory number and each file number in combination designate a particular frame number in the memory card 16. For example, an image file "DSCF0001.JPG" is provided with a frame number "001-0003", which is the combination of a directory number "001" and a file number "0003".

The configuration of an image file will be briefly described hereinafter. Each image file stores image data representative of a single image and attribute information particular to the image. The attribute information is recorded in the form of tags particular to Exif (Exchangeable Image File Format). The tags each store particular detailed information relating to image data, e.g., information representative of the date of pickup or information relating to the camera picked up the image. One of the tags should preferably be allotted to print-out information showing that the image data is designated by the print specification file 400 as image data to be printed out. That is, the print-out information shows that the image data is designated by the print information stored the print specification file 400 of the directory "ORDER". With the print-out information, it is possible to determine whether or not the image file is to be printed out simply by accessing the image file. Further, the image file includes auxiliary image data representative of a reduced image derived from the above image data.

Figure 5:
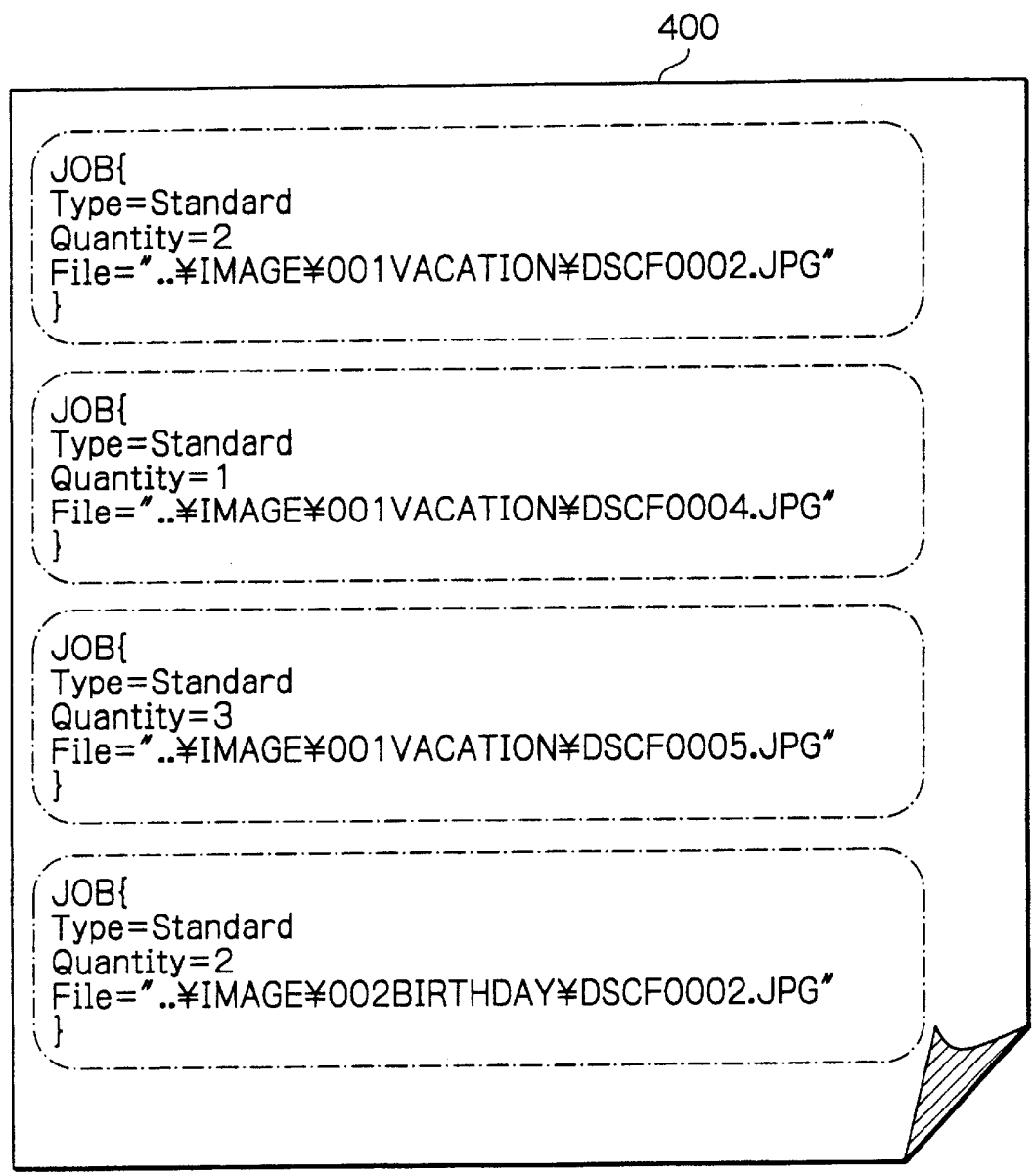
FIG. 5 is a specific list describing a print order file included in the structure of FIG. 4.

As shown in FIG. 5 specifically, the print specification file 400 includes jobs for effecting automatic printing and stores, job by job, information representative of a specified image file and information representative of printing conditions.

The specific print order file 400 describes that the image data of image files corresponding to the frame numbers "001-0002", "001-0004", "001-0005" and "002-0002" shown in FIG. 4 are to be printed. Each job describes the file name of a particular image to be printed. In each job, the path of the image file is specified in the form of a relative path. In addition, the kind of a print, i.e., print quality and print size are specified in each job together with a desired number of prints. Such specification is described between a pair of braces ({ }) following the characters "JOB". Characters specifying the kind of a print and the desired number of prints are generated in the form of a text code and recorded in the directory "ORDER" of the memory card 16 as a file name "PRT_INFO.TXT".

More specifically, the image file " . . . IMAGE¥001¥001VACATION¥DSCF0002.JPG", i.e., provided with the frame number "001-0002" is of a kind (Type) "Standard" and to be output in two prints (Quantity) while being designated by a relative path FILE=" . . . IMAGE¥001¥001VACATION¥DSCF0002.JPG". In this manner, a file name is represented by a relative path as seen from the layer of the directory storing the print order file 400. It follows that a file name can be copied in or moved to another directory while maintaining its relative directory structure.

The image file with the frame number "001-0004" is to be output in a single print while the image file with the frame number "001-0005" is to be output in three prints. Further, the image file with the frame number "002-0002" is to be output in two prints. In this manner, in the illustrative embodiment, the printing of a single image file is specified job by job, and a print file is so constructed as to describe a plurality of jobs. This allows a desired image file to be output in a plurality of prints by a single job specification. It is to be noted that when any one of the jobs shown in FIG. 5 is deleted, the lines allocated to the deleted job may be left blank or may be deleted themselves so as to carry up the successive jobs. Alternatively, a preselected character may be added to the head of the lines describing each job, so that a particular job can be invalidated and skipped over, as needed.

When the memory card 16 having the above configuration is connected to the computer 620, the computer 620 automatically reads the image files specified in the form of jobs out of the memory card 16 in accordance with the paths. The computer 620 then automatically processes the image files in accordance with their types and quantities. The printer 630 prints out the image data of the image files on recording sheets.

In the wireless mode available with the camera 10, as soon as a radio link is set up between the camera 10 and the handy phone set 610, the various kinds of information stored in the memory card 16 are formatted in the previously stated virtual order directory on the basis of the print order file 400. Information representative of the virtual order directory is transferred to computer system 600 via the handy phone 610. The computer system 600 received the virtual order directory reconstructs the original directory structure and therefore the arrangement of the files in the memory card 16. For this purpose, the computer system 600 uses the print order file 400, image files designated by the print order file 400, and directory structure data representative of correspondence between the original paths in the memory card 16 and the file names listed in the virtual order directory. Consequently, even when the information is sent to the computer 620 in the form of the virtual order directory by radio, the computer 620 can execute automatic printing in the same manner as when it directly reads the information out of the memory card 16.

Referring again to FIG. 1, the image pickup 32 includes a CCD (Charge Coupled Device) image sensor for picking up a scene and outputting an image signal representative a color image. In a preparatory stage preceding a shot, a movie mode is set up in which the image pickup 32 continuously generates consecutive frames representative of a scene while outputting moving picture signals. In the movie mode, the controller 30 causes the display panel 18 to display a moving picture represented by the moving picture signals and causes the image pickup 32 to perform automatic focusing on the basis of the image information of the individual frame. In addition, the controller 30 causes the signal processing circuit 34 to control the brightness, gradation, color balance and so forth of the picture.

When the operator of the camera 10 pushes the release button 12, a still picture record mode is set up in which the image pickup 32 outputs an image signal representative of one frame of picture under the control of the controller 30. The signal processing circuit 34 controls the brightness, gradation, color balance and so forth of the above image signal by digital operations and feeds the resulting image signal to the compression/expansion 38 via the frame memory 36.

More specifically, the frame memory 36 stores one frame of image data. The compression/expansion, or compression coding/decoding section, 38 codes one frame of image data stored in the frame memory 36 by compression with a compression ratio matching with an image quality mode specified by the controller 30. Also, the compression/expansion section 38 decodes coded data read out of the memory card 16 and delivers the decoded data to the frame memory 36. In the illustrative embodiment, for compression, the compression/expansion section 38 uses the JPEG system that executes orthogonal transform with each block having 8×8 pixels and quantizes the resulting transform coefficient to thereby produce a Huffman code. For example, the compression/expansion section 38 is so controlled as to adaptively select a quantizing characteristic such that the amount of coded data has a length smaller than a preselected length, thereby coding one frame of image data. The coded data are fed from the compression/expansion section 38 to the card slot 14 to which the memory card 16 is removably connected. As a result, the coded data and attribute information particular thereto are written to a preselected area of the memory card 16. The expansion/compression section 38 and card slot 14 are connected to the transmitter/receiver 46 as well.

The transmitter/receiver 46 plays the role of a communication control circuit for effecting radio communication via a built-in antenna 48 by use of a spread spectrum communication system. Specifically, the transmitter/receiver 46 uses a 2.4 GHz band as a carrier frequency and modulates a carrier wave with the information to be sent to the computer system 600. For example, the transmitter/receiver 46 executes primary modulation with a baseband signal and then executes secondary modulation with the modulated signal by use of a frequency hopping system, thereby implementing spread spectrum communication. Also, the transmitter/receiver 46 is capable of receiving and modulating a radio wave sent by the same communication system. In the illustrative embodiment, the camera 10 and handy phone set 610 are connected to each other by a short range, radio data communication technique. Short range, radio data communication may use a Bluetooth system as an interface while the transmitter/receiver 46 may interchange objects with or transfer files to the handy phone set 610 by using an OBEX (Object Exchange) protocol.

As for a communication protocol between the handy phone set 610 and the computer system 600, use may be made of WAP (Wireless Application Protocol) adaptive to Internet or MMS (Manufacturing Message Specification) protocol applicable to manufacturing systems. The communication system of the handy phone 610 set may be implemented by a PDC (Personal Digital Cellular) system, a GSM (Global System for Mobile communications) system or similar standardized system.

When the operator operates any one of the mode dial 20 and buttons 22 through 28 arranged on the operation panel 40, the controller 30 controls the operations of the image pickup 32, signal processing circuit 34 and frame memory 36 accordingly. The controller 30 is implemented as a microcomputer system including a microprocessor, a ROM storing firmware that defines the control procedure of the microprocessor, and various interfaces connecting peripheral circuits. The controller 30 further includes a register or a RAM or similar semiconductor memory for temporarily storing various interim values and variables and uses it as a work memory. After the print information of the print order file 400, for example, has been written to such a work memory, the operator may correct or change the print information on the work memory. This is successful to promote rapid processing. When the operator, corrected or changed the print information, turns the mode dial 20 for selecting any other mode, the controller 30 writes the corrected or changed print information in the memory card 16 to thereby update the print information existing in the card 16.

Further, the controller 30 controls the storage of the image files recorded in the memory card 16 in accordance with the manipulation of the operation panel 40. Specifically, when the operator turns the mode dial 20 to the play mode position and then selects a desired file on the forward key 24 or the reverse key 26, the controller 30 accesses the image file selected and reads image data out of the file. The controller 30 then arranges the image data in the frame memory 36 and causes the display panel 18 to display the image data via the DAC 44. At the same time, the controller 30 stores the attribute information read out of the memory card 16 together with the above image data and fed thereto via the interface of the card slot 14. The controller 30 sends character codes representative of information, which is contained in the attribute information, to the character generator 42 together with character codes representative of the current operation mode.

The character generator 42 stores character sets of character image data corresponding to character codes to be input thereto in the form of dot patterns. The character image data are read out of the character generator 42 in accordance with the character codes input to the character generator 42 while being output at timings matching with desired positions on the panel 18. These character image data are combined with the image data repeatedly read out of the frame memory 36, so that characters are displayed in or around a reproduced image. Such character information may be displayed in an exclusive portion of the display panel 18 independent of the reproduced image, if desired. Further, codes representative of graphic data in place of character data or an image represented by bit map data may be displayed in combination with the reproduced image.

As stated above, when a single frame of image is reproduced, the controller 30 detects the operator's manipulation of the forward button 24 or the reverse button 26, i.e., the forward or the reverse feed of the frame and thereby selects an image to be displayed. When the operator pushes the set button 22 in addition to the button 24 or 26, the controller 30 increases or decreases the number of prints contained in the stored print information. When the number of prints is reduced to zero, the controller 30 deletes the previously mentioned print-out information relating to the image file being displayed as well as the description relating to the job designated by the print order file 400.

To allow the operator to generate a new job for the image being displayed, the controller 30 sets up a standard print mode in which the type and quantity of prints are "Standard" and "1", respectively. If the print order file 400 itself is not recorded in the memory card 16, then the controller 30 prepares it in the directory "ORDER" and then describes a new job. The new job is added to the image file as print-out information. Further, assume that the operator pushes the set button 22 and delete button 28 at the same time when print-out information exists in the image being displayed. Then, the controller 30 deletes a job represented by the print-out information from the print information stored in the controller 30 as well as the print-out information.

On the transition of the mode, for example, the controller 30 writes the order information changed by the above-described procedure in the memory card 16 over the order information existing in the memory card 16, thereby updating the print order file 400. When the print-out information is generated or changed, the controller 30 may rewrite information contained in the image file. Alternatively, the controller 30 may write the new print-out information in the memory card 16 over the print information, which exists in the memory card 16, at the time when the print file of the memory card 16 is updated.

When the handy phone set 610 informs the controller 30 of the fact that it has selected "Specified Print", the controller 30 recognizes such a status of the handy phone set 610. The controller 30 then starts print order processing in order to cause each image file designated by the print order file 400 to be printed in particular conditions. For this purpose, the controller 30 stores a destination number beforehand so as to be connectable to the computer system 600. At the time of print order processing, the controller 30 reports the destination number to the handy phone set 610 by radio. After a radio link has been set up between the camera 10 and the handy phone set 610 and then between the handy phone 610 and the computer system 600, the controller 30 produces a virtual order directory mentioned earlier. The controller 30 then sends files to the handy phone 610 via the transmitter/receiver 46 in accordance with the virtual order directory. Alternatively, the controller 30 may produce the virtual order directory, store it therein, and then access the handy phone set 610.

Figure 7:
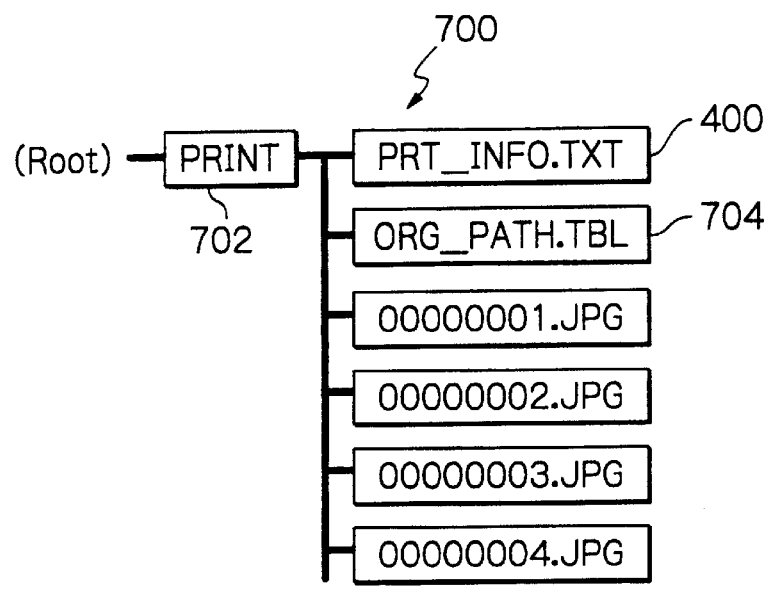
FIG. 7 is a diagram showing a specific virtual order directory structure.

The structure of a virtual order directory will be described specifically with reference to FIG. 7. Assume that the image files stored in the memory card 16 in the real directory structure of FIG. 4 are specified by the print order file 400 of FIG. 5. Then, the controller 30 produces a virtual order directory 700 shown in FIG. 7. As shown, the virtual order directory 700 includes a preselected particular directory "PRINT" 702 subordinate to the root directory "Root". The various files are subordinate to the directory "PRINT" 702 in a flat structure, as distinguished from the layered structure. That is, the print order file (PRT_INFO.TXT) 400, a directory information file (ORG_PATH.TBL) 704 and the specified image files (0000000.JPG through 00000004.JPG) are arranged in the directory "PRINT" 702 in the same layer as each other. The file names of the image files are replaced with tentative handle names, e.g., serial integral number beginning with "00000001.JPB". Such handle names prevent the file numbers of the image files overlapping in the real directory structure from overlapping in the virtual directory structure.

As stated above, the virtual order directory lists the various files in the particular directory "PRINT" 702 in a flat structure. The handy phone 610 therefore determines the files to be sent to the computer system 600 simply by referencing the directory "PRINT" 702. However, because the virtual directory structure differs from the real directory structure, the handy phone 610 cannot directly use the paths of the image files designated by "File= . . . " of the print order file 400. In light of this, the controller 30 additionally generates the previously mentioned directory information file (ORG_PATH.TBL) 704. The directory information file 704 allows the original directory structure to be reconstructed on the basis of the file contents of the virtual order directory 700. The image files can therefore be designated by the contents of the jobs described in the print order file 400.

Figure 8:
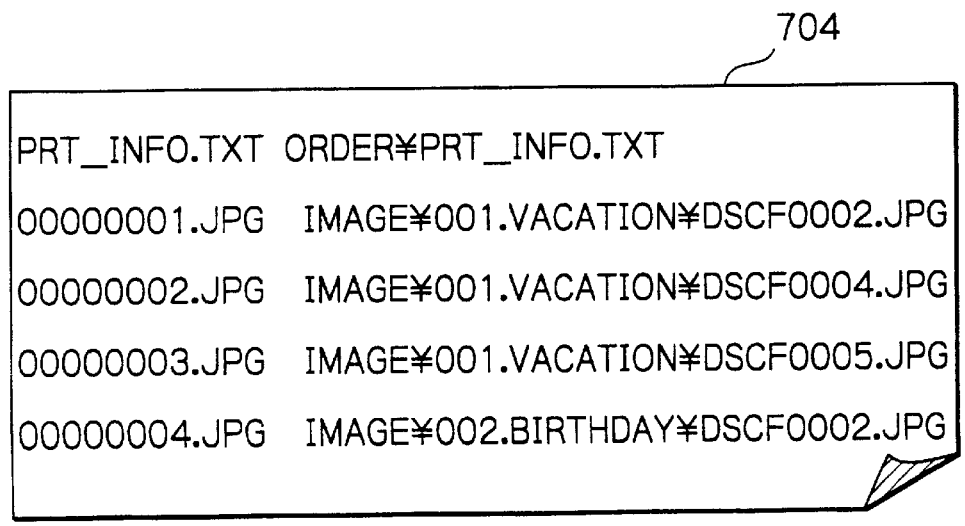
FIG. 8 is a specific list describing a directory information file included in the structure of FIG. 7.

FIG. 8 shows specific contents described in the directory information file 704. The directory information file 704 provided with the file name "ORG_PATH.TBL" allows the directory structure within the camera 10 to be reconstructed and thereby allows automatic printing to be effected in accordance with the contents specified by the print order file 400. As shown, the file 704 is implemented as table data described in text code and written to the work memory. Specifically, the file 704 describes the file name and path of the print order file 400 on the first line. On each of the second and successive lines, the file 704 describes a particular virtual image file name, the original image file name derived the virtual image file name, and the original path in the memory card 16 in a single row. The original path is described as a relative path from the directory layer storing the directory information file 704. The controller 30 reports the virtual order directory 700 to the handy phone set 610 and sends the contents of the above files to the phone 610 via the transmitter/receiver 46 by radio.

The handy phone set 610 has a mobile radiophone function and is connectable to a desired destination via the communication network 640, FIG. 6, by communicating with the base station 642. In addition, the handy phone set 610 is capable of interchanging information with the camera 10 by the previously mentioned Bluetooth type, short-range radio data communication. More specifically, the handy phone set 610 sets up a radio link between it and the camera 10, then receives all of the files stored in the directory "PRINT" of the virtual order directory from the camera 10, and then transfers them to the computer 620.

Figure 9:
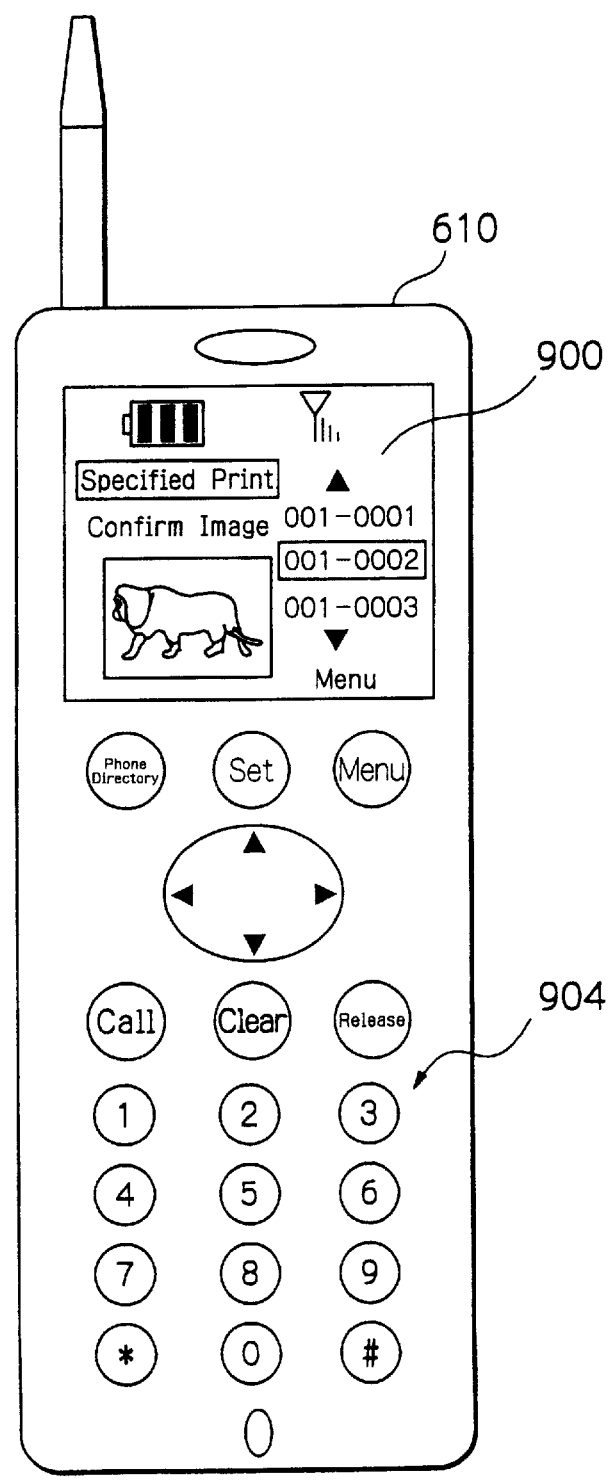
FIG. 9 is a front view showing specific external appearance of a handy phone set included in the system of FIG. 6.

FIG. 9 shows a specific configuration of the handy phone set 610. As shown, the handy phone set 610 includes a display panel 900 for displaying a menu picture that allows the operator to select the specified print. Also, the handy phone set 610 is capable of displaying the images stored in the memory card 16 of the camera 10, so that the operator can confirm the images. Specifically, a cursor key 902 for selecting desired one of upward, downward, rightward and leftward directions in the menu picture, numeral keys 904 and symbol keys "*" and "#"are arranged on the handy phone set 610. To confirm the images, the operator selects "Image Confirmation" in the menu picture and then selects a desired frame by designating a frame number assigned to the frame on the cursor key 902 or the numeral keys 904 and the symbol keys "*" and "#". Further, keys "Phone Directory", "Set", "Menu", "Call", "Clear" and "Release" are arranged on the handy phone set 610 around the cursor key 902, as illustrated.

With the above configuration, the handy phone set 610 displays frame numbers in accordance with the structure of the virtual order directory received from the camera 10, allowing the operator to select desired frames. Further, every time the operator moves the frame number upward or downward, the handy phone set 610 receives a reduced image designated by the frame number from the camera 10 and displays it. When the operator selects "Specified Print" in the menu picture, the handy phone set 610 receives all of the files of the directory "PRINT" from the camera 10 and then sends them to the computer system 600 by radio.

Figure 10:
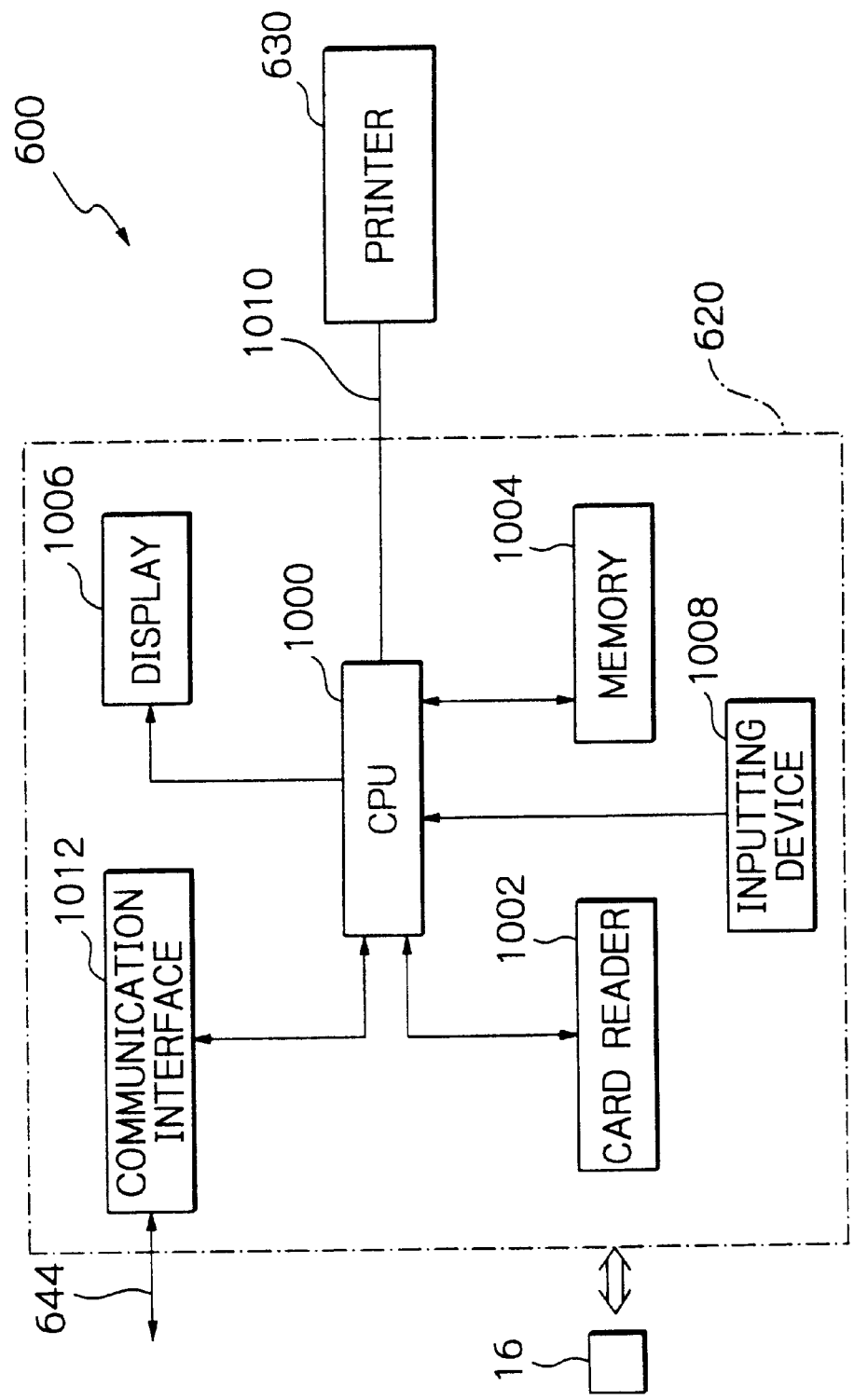
FIG. 10 is a schematic block diagram showing a specific configuration of a computer also included in the system of FIG. 6.

A specific configuration of the computer 620 will be described with reference to FIG. 10. As shown, the computer 620 is generally made up of a CPU 1000, a card reader 1002, a memory 1004, a display 1006, an inputting device 1008, and a communication interface 1012. The card reader 16 reads the print order file 400 out of the memory card 16. The CPU 1000 reads the image files designated by the jobs, which are listed in the print order file 400, out of the memory card 16. The CPU 1000 then decodes the image files and transforms them to data to be printed out. In this sense, the CPU 1000 plays the role of an image processing unit.

More specifically, the CPU 1000 prepares an order acceptance directory "ORDERn" in the memory 1004 beforehand order by order. The CPU 1000 recognizes the contents described in the print order file 400 and writes the image files designated by the jobs, which are listed in the print order file 400, in the above directory "ORDERn". The CPU 1000 then generates print data in image sizes corresponding to the types of prints specified by the jobs while generating display data to appear on the display 1006. At this instant, the CPU 1000 automatically adjusts the color balance and brightness of the individual image as well as gradation. Alternatively, an operator in charge of the computer 620 may set desired correction parameters by hand, as needed. Further, the operator may select the directory of files stored in the memory 1004 in accordance with any desired order so as to produce prints based on the order.

The CPU 1000 delivers the print data to the printer 630 via its output 1010. Specifically, the printer 630 is connected to the output of the CPU 1000 by the connection line 1010 in a network configuration. The computer 620 and printer 630 therefore constitute a print server in combination.

Furthermore, the CPU 1000 reconstructs the original directories prepared by the camera 10. Specifically, the CPU 1000 analyzes the information received from the camera in the form of the virtual order directory and then arranges the image files designated by the print order file 400 and directory information file 704 in the order acceptance directory "ORDERn" in such a manner as to reconstruct the original directory structure. At this time, by analyzing the contents described in the directory information file 704, the CPU 1000 reconverts the file names of the image files represented by the handle names to the original file names and paths thereof.

Figure 11:
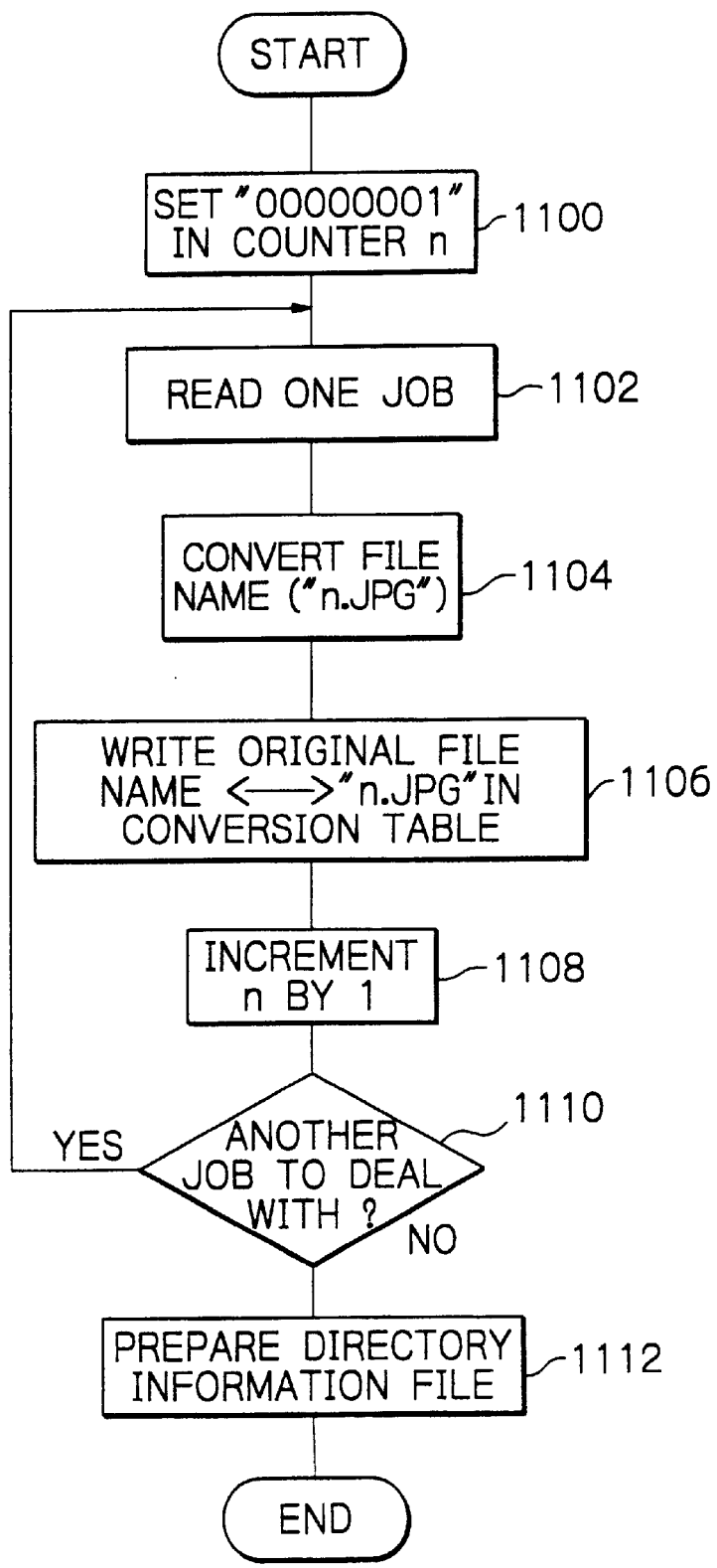
FIG. 11 is a flowchart demonstrating a specific operation of the digital camera.

Reference will be made to FIGS. 11 through 15 for describing a specific operation of the print ordering system 1. Assume that the operator of the camera 10 selects the wireless mode on the mode dial 20. Then, as shown in FIG. 11, the controller 30 of the camera 10 sets "00000001" in a counter n included therein (step 1100). Subsequently, the controller 30 reads the print order file 400 stored in the memory card 16 to thereby read the description of one job, i.e., the first job shown in FIG. 5. The controller 30 then converts the file name "DSCF0002.JPG" of the image file designated by the above job to 37 0000001.JPG", which corresponds to the current count of the counter n (step 1104). The controller 30 lists the converted file name "00000001.JPG" on a conversion table (step 1106).

After the step 1106, the controller 30 increments the counter n by 1 (one) (step 1108) and then determines whether or not any other job to be dealt with is present (step 1110). If the answer of the step 1110 is positive (YES), the controller 30 returns to the step 1102 so as to repeat the loop including the steps 1104 through 1110. If the answer of the step 1110 is negative (NO), meaning that all the jobs listed in the print order file have their file names fully converted, the controller 30 prepares the directly information file 704, FIG. 8, and writes it in the work memory (step 1112).

Figure 14:
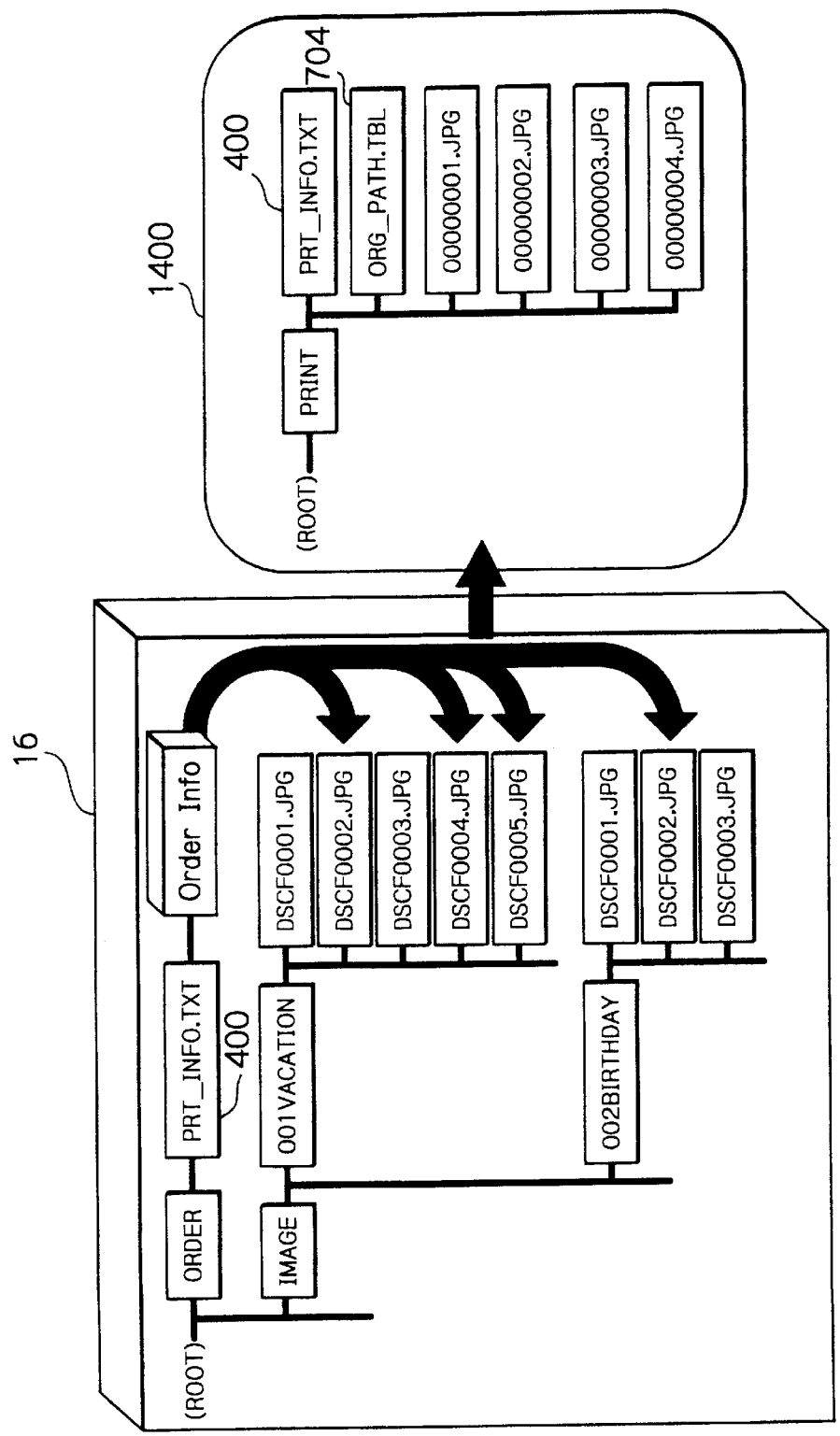
FIG. 14 is a diagram showing how the directory structure of the memory card is converted to the virtual order directory in the illustrative embodiment.

When the handy phone 610 accesses the camera 10, the camera 10 informs the phone 610 of the virtual order directory storing the print order file 400, directory information file 704 and image files in the same layer of the directory "PRINT" 702. FIG. 14 shows a specific virtual order directory based on the contents described in the print order file 400 of the memory card 16, i.e., order information (Order Info). As shown, the print order file 400, directory structure data 704 and converted file names "00000001.JPG", "00000002.JPG" and so forth of the designated image files are stored in the same layer of the directory "PRINT".

Assume that the operator, watching the display panel 900 of the handy phone set 610, selects the "Specified Print" in the menu picture. Then, the phone 610 acquires all of the files listed in the directory "PRINT" 702 and sends them to the computer 620 in accordance with a destination number also received from the camera 10. If the virtual order directory is not prepared in the camera 10, the handy phone 610 displays a message informing the operator of the absence of the virtual order directory, e.g., "Printing is not specified."

Figure 12:
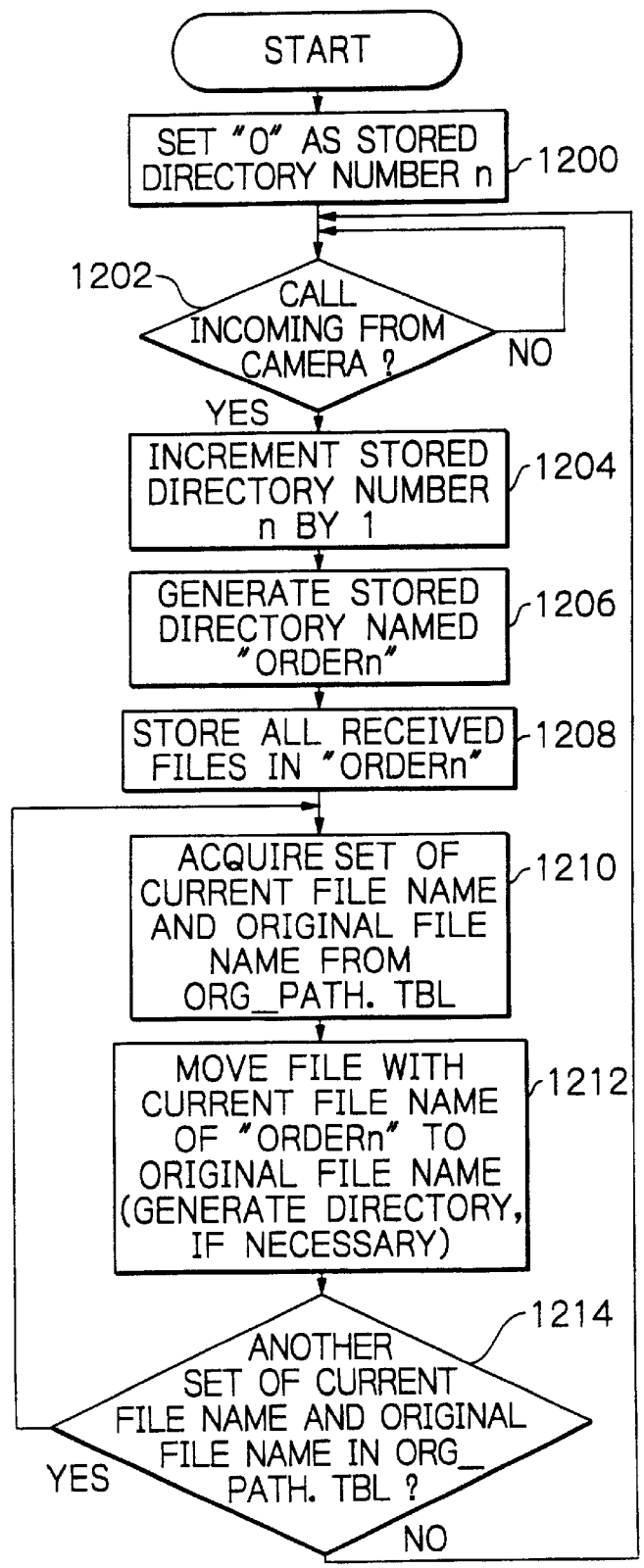
FIGS. 12 and 13 are flowcharts each demonstrating a specific operation of the computer.

As shown in FIG. 12, the computer 620 initializes the stored directory number n to "0" (step 1200). When the computer 620 detects a call incoming from the camera 10 and handy phone 610 (YES, step 1202), the computer 620 increments the stored directory number n to "1" (step 1204). The computer 620 then prepares a stored directory with a directory name "ORDERn" in the memory 1004 (step 1206) and sequentially writes all of the files received from the camera 10 via the handy phone 610 in the directory "ORDERn" (step 1208). Subsequently, the computer 620 analyzes the contents described in the directory information file 704, which is present in the directory "ORDERn" (step 1210).

Figure 15:
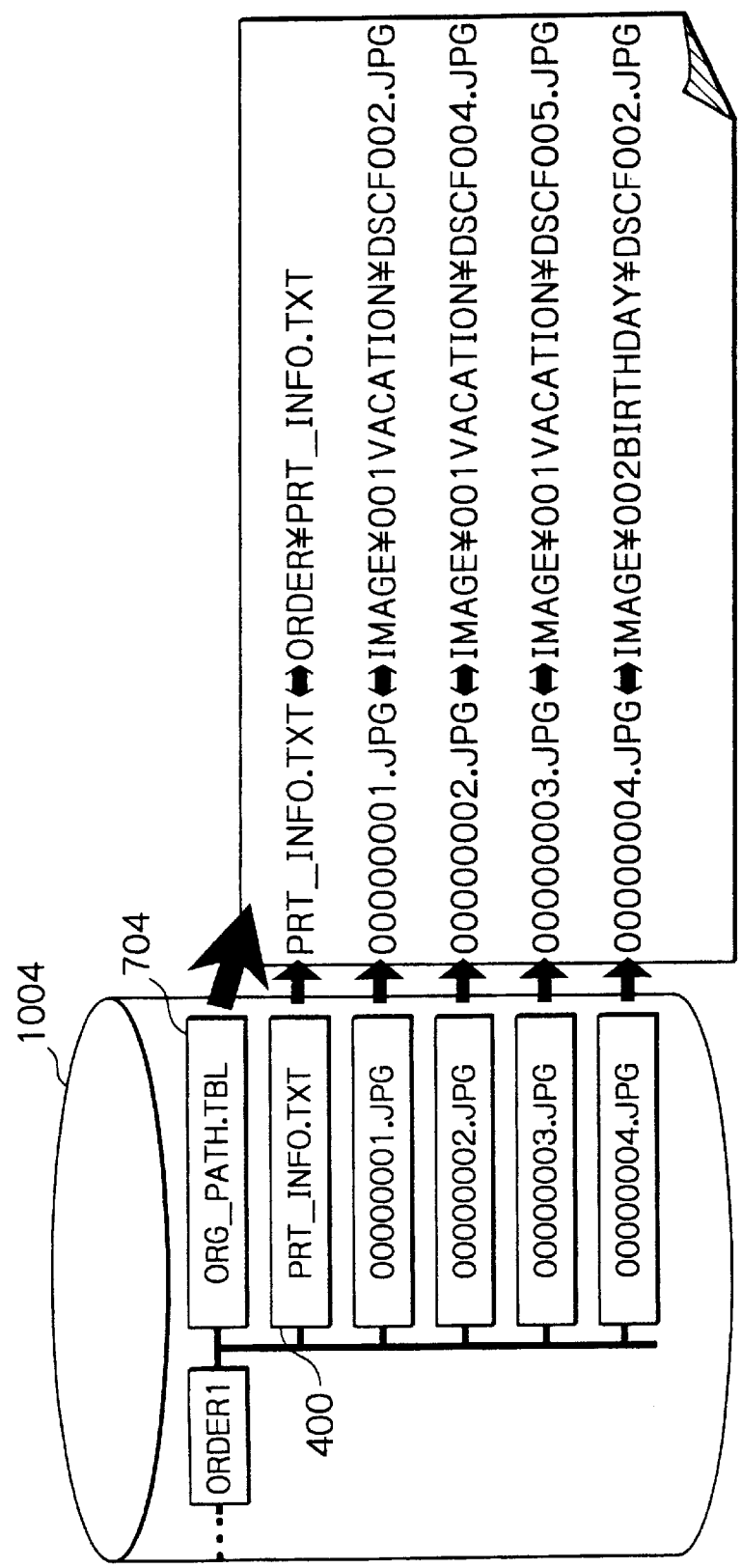
FIG. 15 is a diagram showing how file names are converted in the illustrative embodiment.

Specifically, as shown in FIG. 15, the computer 620 sets a directory "ORDER1" stored in the memory 1004 as a current directory. The computer 620 then replaces the print order file (PRT_INFO.TXT) 400 with the print order file (ORDER¥PRT_INFO.TXT) of the original path and moves the restored print order file 400 to a directory "ORDER" subordinate to the directory "ORDER1". Further, the computer 620 acquires the current file name "00000001.JPG" and original file name "IMAGE¥001VACATION¥DSCF0002.JPG" described on the second line of the directory information file 704 in a pair.

Subsequently, the computer 620 replaces the current file name with the original file name and moves the image file to a layer corresponding to the path of the original file name within the directory name "ORDER1" (step 1212). More specifically, the computer 620 replaces the file name "00000001.JPG" with the original file name "IMAGE¥001VACATION¥DSCF0002.JPG". As a result, the image file "DSCF0002.JPG" is moved to a directory "IMAGE¥001VACATION" subordinate to the directory "ORDER1".

After the step 1212, the computer 620 determines whether or a current file name and an original file name are described on the third line of the directory information file 704 in a pair (step 1214). If the answer of the step 1214 is YES, the computer 620 replaces the current file name on the third line with the original file name and moves the image file to a layer corresponding to the path of the original file name. The computer 620 repeats such a procedure with all of the file names described in the third line and successive lines, thereby reconstructing the original directory structure. FIG. 16 shows the directory structure reproduced in the memory 16. As shown, the directory "ORDER1", or current directory, is a faithful reproduction of the directory structure stored in the memory card 16.

With the directory structure reconstructed in the memory 1004, the computer 620 is capable of executing printing in the same manner as when it directly reads the files out of the memory card 16.

Figure 13:
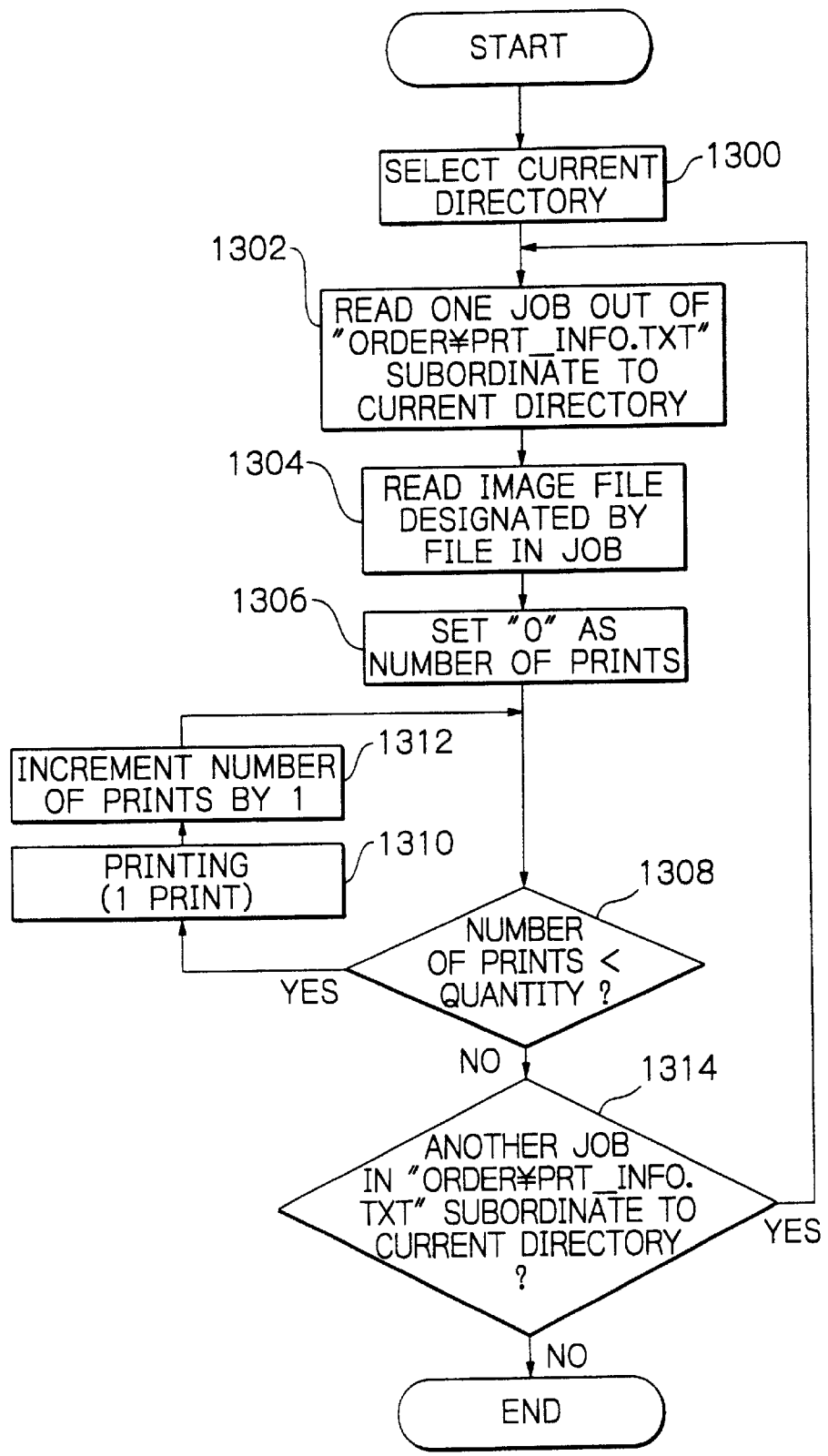

Specifically, as shown in FIG. 13, the current directory "ORDER1" is automatically selected on the end of transmission from the camera 10 or selected by the operator (step 1300). As a result, the print order file "ORDER¥PRT_INFO.TXT" is read out of the memory 1004 and transferred to the CPU 1000, so that one of the jobs described in the print order file is obtained (step 1302). Subsequently, the image file designated by "File=", which is included in the job, is read out of the memory 1004 (step 1304).

After the step 1304, the computer 620 initializes the number of prints to "0" (step 1306) and then determines whether or not the number of prints is smaller than the specified number of prints "Quantity" (step 1308). Because the number of prints 37 0" is smaller than "Quantity" (YES, step 1308), the computer 620 executes print processing with the image file designated by the job (step 1310). The microcomputer 620 then increments the number of prints by 1 (step 1312) and again compares the resulting number of prints with the specified number "Quantity" (step 1308). Because the number of prints "Quantity" specified by the first job is "2", the computer 620 repeats the steps 1310 and 1312, i.e., the print processing. When the answer of the step 1308 changes from YES to NO, the computer 620 determines whether or not another job to be dealt with exists in the print order file "ORDER¥PRT_INFO.TXT" (step 1314). If the answer of the step 1314 is YES, the computer 620 returns to the step 1302. If the answer of the step 1314 is NO, the computer 620 ends the procedure. In this case, if the result of printing is acceptable, the computer 620 deletes the files subordinate to the directory "ORDER1".

As stated above, in the illustrative embodiment, the handy phone set 610 is capable of identifying image files designated by the camera 10 in the form of a virtual directory structure. Therefore, at the time of file transfer, the handy phone set 610 has only to recognize a single layer in a single directory and is free from heavy processing loads. The print server, which is made up of the computer 620 and printer 630, reconstructs the original file structure on the basis of the directory information file representative of a directory structure. The print server can therefore execute print processing in the same manner as when it directly accesses the memory card 16. This makes it needless to change or modify the conventional printing procedure and therefore simplifies the construction. Such advantages are achievable without changing the contents of a print order file customary with a media hand-over type of print ordering system.

In the illustrative embodiment, the computer 620 reconstructs the original file structure and then executes print processing. In an alternative procedure also available with the present invention, the computer 620 finds the path of an image file designated by "File=" in a job out of a directory information file and recognize a current file name associated with the above path and converted before transmission. The computer 620 then reads out the image file with a converted file name in the event of the execution of the job and prints the image file.

Further, in the illustrative embodiment, the handy phone set 610 and computer system 600 communicate with each other via the communication network 640. If desired, the handy phone set 610 and computer 620 may communicate with each other in the same manner as the camera 10 and phone set 610 communicate with each other. Also, a short range, radio data communication interface may be used to implement direct communication between the camera 10 and the computer 620. In such a case, the camera 10 will inform the computer 620 of the specified printing while the computer 620 will recognize it and automatically execute print processing.

In summary, in accordance with the present invention, a print order relating to image files stored in a data storing medium can be placed by radio communication. At this instant, necessary files can be accessed and transferred to printing means without any noticeable change in the configuration of communicating means or any noticeable load on the communicating means. Further, order information describing the print order to be sent has the same format as order information stored in the data storing medium to be directly handed over to the printing means. Moreover, the printing means can execute the same print processing as when it directly reads image files out of the data storing medium. In addition, the printing means reconstructs a file structure stored in the data recording medium by using structure information and then produces prints in accordance with the order information. The printing means can therefore deal with various kinds of file structures that may be stored in the data recording medium.

The entire disclosure of Japanese patent application No. 10122/2000 filed Jan. 14, 2000 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A print ordering method for causing, via a communicating device, a printing device to print images represented by image data stored in an original directory structure of a data recording medium, said data recording medium storing said image data and order information for causing said printing device to print desired image data, said print ordering method comprising:

selecting image files designated by the order information;

informing the communicating device of a virtual directory structure comprising the image files selected and the order information; and sending structure information for allowing the original directory structure to be reconstructed from the virtual directory structure to said communicating device together with the order information and the image data selected.

2. A method in accordance with claim 1, wherein said data recording medium stores the image data in a plurality of directories, said method further comprising:

converting a first file name to a second file name and positioning the image data designated by said second file name in a preselected layer in the virtual directory structure.

3. A method in accordance with claim 2, further comprising:

describing the first file name and the second file name in the structure information in a pair.

4. A method in accordance with claim 3, wherein the printing device reconstructs the information stored in the data recording medium based on a description of the pair.

5. A method in accordance with claim 1, further comprising:

causing the printing device to receive the order information, the image data and the structure information via the communicating device;

causing the printing device to reproduce relatively positions where the image data are stored, which are designated by the order information, at positions where said image data are stored in the data recording medium; and causing the printing device to print the image data designated by the order information in accordance with said order information.

6. A method in accordance with claim 1, wherein when the print order is placed without use of the communicating device, said printing device directly reads the information out of the data recording medium and prints the image data in accordance with the order information.

7. A print ordering apparatus for causing, via a communicating apparatus, a printing apparatus to print images represented by image data stored in an original directory structure of a data recording medium, said data recording medium storing said image data and order information for causing said printing apparatus to print desired image data, said print ordering apparatus comprising:
   a section configured to select image files designated by the order information;
   a section configured to inform the communicating apparatus of a virtual directory structure comprising the image files selected and the order information; and
   a section configured to send structure information for allowing the original directory structure to be reconstructed from the virtual directory structure to said communicating apparatus together with the order information said the image data selected.

8. An apparatus in accordance with claim 7, wherein said data recording medium stores the image data in a plurality of directories, said apparatus converting a first file name of said image data to a second file name and positioning the image data designated by said second file name in a preselected layer in the virtual directory structure.

9. An apparatus in accordance with claim 8, further comprising a section configured to describe the first file name and the second file name in the structure information in a pair.

10. A print ordering system comprising:
   a print ordering apparatus for ordering prints of images represented by image data stored in a data storing medium, which stores said image data in an original directory structure of a plurality of directories and order information for causing desired image data to be printed;
   a communicating apparatus; and
   a printing apparatus for producing prints of the desired image data in accordance with the order information received from said print ordering apparatus via said communicating apparatus,
   said print ordering apparatus comprising:
      a section configured to select image files designated by the order information;
      a section configured to inform the communicating apparatus of a virtual directory structure, which includes the image files selected and the order information, by converting a first file name of the image data to a second file name and positioning the image data designated by said second file name in a preselected layer in said virtual directory structure; and
      a section configured to send to said communicating apparatus the order information, the image data selected and structure information that describes said first file name and said second file name in a pair for allowing the original directory structure to be reconstructed based on the virtual directory structure,
   said printing apparatus comprising:
      a section configured to receive the image data, the order information and the structure information sent from said communicating apparatus;
      a section configured to reconstruct the original directory structure existing in said recording medium based on a description of the pair; and
      a section configured to produce prints of the image data designated by the order information.

11. A system in accordance with claim 10, wherein said section configured to reconstruct the original directory structure reproduces relatively positions where the image data are stored, which are designated by the order information, at positions where said image data are stored in the data recording medium.

12. A system in accordance with claim 10, wherein when the print order is placed without use of the communicating apparatus, said printing apparatus directly reads the information out of the data recording medium and prints the image data in accordance with the order information.

13. A printing apparatus for receiving images represented by image data stored in an original directory structure of a data storing medium via communicating apparatus and printing said image, said printing apparatus comprising:
   a section configured to receive via the communicating apparatus the image data and order information, which causes desired image data and order information, which causes desired image data to be printed, in a virtual directory structure virtually indicating a directory construction of said image data and said order information;
   a section configured to receive structure information for reconstructing the original structure from said virtual directory structure;
   a section configured to reconstruct, based on the structure information, a directory structure of the image data and said structure information, in the data storing medium; and
   a section configured to print out the image data, which have the directory structure reconstructed, in accordance with the order information.

14. An apparatus in accordance with claim 13, further comprising a section configured to reconstruct, if a file name assigned to the image data has been changed, an original file name by using the structure information.

15. A method for communicating an image and an image directory for the image residing in a hierarchical physical original directory of a digital camera, said method comprising:
   creating a print directory;
   creating a directory file in the print directory;
   adding a set of directory information corresponding to the digital picture's location in the hierarchical physical original directory to the directory file;
   renaming the image;
   adding the image to the print directory; and
   communicating the print directory to a server.

16. The method of claim 15, further comprising:
   adding a second set of directory information corresponding to a second image's location in the hierarchical physical original directory to the directory file;
   renaming the second image such that a name of the first image and a name of the second image are guaranteed not to be the same; and
   adding the second image to the print directory.

17. The method of claim 15, further comprising:
   creating a print order file to identify a number of prints to order.

18. The method of claim 15, wherein the communication comprises:

communicating the print directory to the server using a mobile communication device.

19. A print ordering system for enabling print ordering for prints stored in a hierarchical physical original directory, said print ordering system comprising:

a print directory;

a directory file located in the print directory;

an image file;

a set of directory information in the print directory, said directory information identifying an initial location in the hierarchical physical original directory for an image file located in the print directory; and a processor configured to cause the image file to be moved between the hierarchical physical original directory and the print directory.

20. A system in accordance with claim 19, wherein the processor is additionally configured to cause the image file to be renamed, and to cause the set of directory information to be updated based on the moving and the renaming of the image file.

21. A system in accordance with claim 19, further comprising:

a print order file configured to store information that identifies a number of prints to order.

22. A system in accordance with claim 19, further comprising:

a mobile communication device configured to transmit the image.

* * * * *